US012566410B2

(12) United States Patent
Lagorgette

(10) Patent No.: US 12,566,410 B2
(45) Date of Patent: Mar. 3, 2026

(54) TIMEPIECE PROVIDED WITH A DISPLAY FOR ADAPTIVE SELECTION OF MANUAL COMMANDS

(71) Applicant: ETA SA MANUFACTURE HORLOGERE SUISSE, Grenchen (CH)

(72) Inventor: Pascal Lagorgette, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 553 days.

(21) Appl. No.: 17/988,452

(22) Filed: Nov. 16, 2022

(65) Prior Publication Data

US 2023/0195047 A1 Jun. 22, 2023

(30) Foreign Application Priority Data

Dec. 22, 2021 (EP) .................................... 21216716

(51) Int. Cl.
*G04G 21/06* (2010.01)
*G04G 21/02* (2010.01)
*G04G 21/08* (2010.01)

(52) U.S. Cl.
CPC ............ *G04G 21/06* (2013.01); *G04G 21/08* (2013.01); *G04G 21/02* (2013.01)

(58) Field of Classification Search
None
See application file for complete search history.

(56) References Cited

U.S. PATENT DOCUMENTS 9,582,165 B2 * 2/2017 Wilson ................ G06F 3/04842
10,534,900 B2 * 1/2020 Cheong .................. G06F 21/34
(Continued)

FOREIGN PATENT DOCUMENTS

JP 2017-120584 A 7/2017
JP 2017-194779 A 10/2017
(Continued)

OTHER PUBLICATIONS

Hardwick, Tim, How to Use Siri to Control Your HomeKit Devices, MacRumors, Mar. 22, 2019, www.macrumors.com/how-to/use-siri-to-control-homekit-devices/. Accessed Apr. 29, 2025. (Year: 2019).*
(Continued)

*Primary Examiner* — Regis J Betsch
*Assistant Examiner* — Michael James Walker
(74) *Attorney, Agent, or Firm* — Sughrue Mion, PLLC

(57) ABSTRACT

A timepiece (1) intended to transmit commands to an external device (70), including: a digital display (6); a wireless communication circuit (82); a manual selection interface (5, 6); a microphone (87); and a processing unit (81) configured to: transmit a command to an external device (70) depending on an audible signal received on the microphone (87); depending on a history of previously selected commands, environment criteria, behavioural criteria, physiological criteria of the wearer of the timepiece, or state criteria of the external device, define a list of command suggestions to be displayed; display on the digital display (6) a command interface comprising the command suggestions (cmd1, cmd2, cmd3, cmd4, cmd5, cmd6, cmd7) of the defined list.

14 Claims, 8 Drawing Sheets

(56) References Cited

U.S. PATENT DOCUMENTS

| | | | | |
|---|---|---|---|---|
| 10,599,101 | B2 * | 3/2020 | Rothkopf | G04G 21/025 |
| 10,779,085 | B1 * | 9/2020 | Carrigan | G06F 3/167 |
| 11,157,436 | B2 * | 10/2021 | Mistry | H04W 4/80 |
| 2010/0050128 | A1 * | 2/2010 | Chiang | G06F 3/0482 715/847 |
| 2015/0061842 | A1 | 3/2015 | Yoon et al. | |
| 2015/0082242 | A1 * | 3/2015 | Antipa | G06F 3/0482 715/811 |
| 2016/0034887 | A1 | 2/2016 | Lee | |
| 2017/0251962 | A1 | 9/2017 | Shiho | |
| 2017/0353655 | A1 | 12/2017 | Torikai | |
| 2018/0367659 | A1 | 12/2018 | Kondo et al. | |

FOREIGN PATENT DOCUMENTS

| | | | |
|---|---|---|---|
| JP | 2017-215858 | A | 12/2017 |
| JP | 2021-192178 | A | 12/2021 |
| KR | 10-2016-0015693 | A | 2/2016 |
| KR | 10-2018-0107296 | A | 10/2018 |
| WO | 2012/128824 | A1 | 9/2012 |

OTHER PUBLICATIONS

European Search Report for 21 21 6716 dated Jun. 5, 2022.

* cited by examiner

TIMEPIECE PROVIDED WITH A DISPLAY FOR ADAPTIVE SELECTION OF MANUAL COMMANDS

CROSS REFERENCE TO RELATED APPLICATIONS

The present application is based on, and claims priority from the prior European Patent Application No. 21216716.7, filed on Dec. 22, 2021, the entire contents of which are incorporated herein by reference.

TECHNICAL FIELD OF THE INVENTION

The invention relates to timepieces intended to assist their user in the control of another device.

Due to their immediate availability and to their often permanent wearing for the user, timepieces are ideally placed to serve as remote controls. New types of timepieces thus constitute a tool of choice for collecting commands from the user to other devices. Such devices may for example include a television, an audio system, a home automation installation or portable earphones.

New timepieces have appeared and propose a microphone intended to collect voice commands and a radio interface to transmit the voice command to the device concerned or to a gateway. A processing device, either in the timepiece, or remote, converts the audible signal received on the microphone into a digital command for the device concerned. The availability of a voice command is particularly useful during the driving of a motor vehicle, during a sports activity, during a bicycle trip or even during a domestic activity that may immobilise the hands of the user.

In a certain number of situations, the voice command may be unsuitable. Thus, when the environment is too noisy, the audible signal received on the microphone may have an insufficient quality for the voice command to be able to be converted into a digital command for the device concerned. On the other hand, the environment may impose silence, for example in a public place or in public transport.

It is known in the prior art timepieces making it possible for the user to be able to enter commands. Such timepieces conventionally have a digital display screen and a selection interface, for example in the form of a touch detection on the surface of the digital display screen. Such a screen is likely to display a command interface comprising a plurality of command suggestions to controlled devices. When one of the commands displayed is selected through the selection interface, it is subsequently transmitted to the controlled device.

However, such a timepiece has a number of drawbacks. Indeed, with little available surface on the digital display screen, the display of command suggestions may be fairly unsuitable, therefore few commands may be suggested simultaneously on this screen. In addition, if a certain number of these commands are unavailable or inappropriate, the manual command selection mode is tedious to use.

The invention aims to resolve one or more of these drawbacks.

SUMMARY OF THE INVENTION

One of the aims of the invention is to have a timepiece that is capable of displaying a command interface of a controlled or external device that is clear, precise, intuitive, effective and/or adapted as close as possible to the assistance needs of the user of this part within the scope of controlling this external device.

Another of the aims of the invention is to have a timepiece that is capable of dynamically generating this command interface depending on the assistance needs of the user of this part for controlling this external device.

In this aim, the invention relates to a timepiece intended to transmit commands to an external device, comprising:

- a digital display;
- a wireless communication circuit with an external device;
- a manual selection interface;
- a microphone;
- a processing unit configured to:
  - transmit a command to an external device depending on an audible signal received on the microphone, through the wireless communication circuit;
  - depending on a history of previously selected commands, environment criteria, behavioural criteria, physiological criteria of the wearer of the timepiece, or state criteria of the external device, define a list of command suggestions to be displayed;
  - display on the digital display a command interface comprising said command suggestions of the defined list;
  - identify the selection of a command displayed on the digital display, through the manual selection interface;
  - transmit a command to an external device depending on the command the selection of which is identified, through the wireless communication circuit.

According to one variant, the timepiece further comprises an interface for measuring physiological data of a wearer of the timepiece, said processing unit being configured to define the list of command suggestions to be displayed depending on physiological criteria of the wearer of the timepiece.

According to another variant, the timepiece further comprises a geolocation device, said processing unit being configured to define the list of command suggestions to be displayed depending on the position of the timepiece determined by the geolocation device.

According to another variant, the timepiece further comprises a memory storing one or more of the last commands transmitted, said processing unit being configured to define the list of command suggestions to be displayed by including one or more of the last commands stored or one or more commands contrary to these last commands.

According to another variant, the timepiece further comprises an accelerometer, said processing unit being configured to define the list of command suggestions to be displayed depending on the accelerations measured by the accelerometer.

According to yet another variant, said processing unit is configured to define the list of command suggestions to be displayed depending on a state criterion detected for an external device positioned close to the timepiece.

According to yet another variant, the manual selection interface is a touch screen associated with the digital display.

Advantageously, in another variant, the processing unit implements a learning algorithm that is able to dynamically contribute to generating on the digital display said command interface comprising the command suggestions.

BRIEF DESCRIPTION OF THE FIGURES

Other specific features and advantages will become clearly apparent from the following description made here-after, by way of indicative and non-limiting example, with reference to the appended figures, wherein.

DETAILED DESCRIPTION OF THE INVENTION

Figure 1:
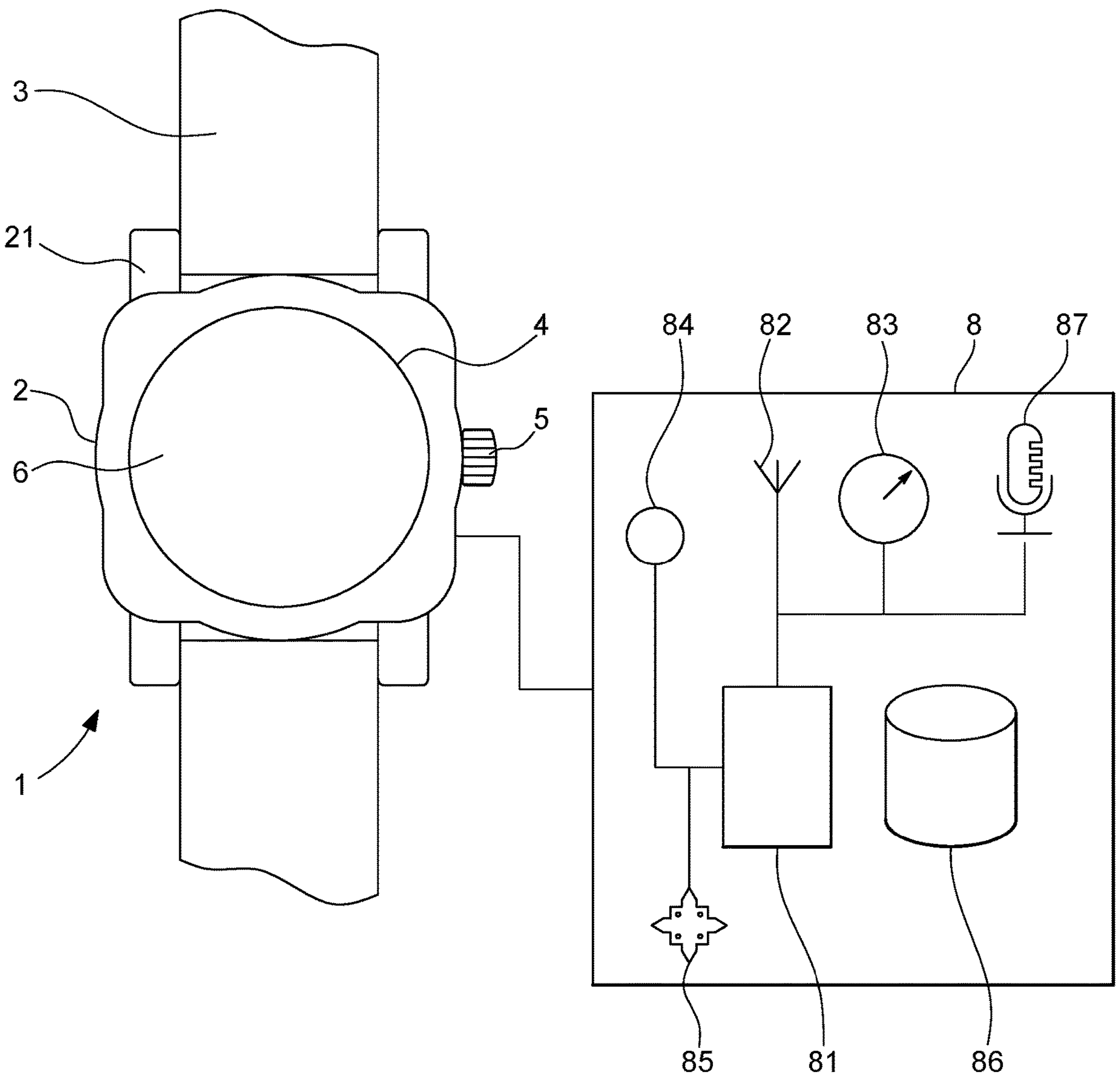
FIG. 1 is a top view of an example of watch for which the invention may be implemented.

FIG. 1 illustrates a schematic representation of a timepiece in the form of a watch 1 in top view, provided for illustrative purposes and for which the invention is likely to be implemented. The watch 1 includes a case 2 provided with a middle. The watch 1 here includes a bracelet 3 fastened to the case 2. To this end, the watch 1 includes on either side of its middle, two horns 21 each arranged to fasten a different strand of the bracelet 3. The watch 1 here includes an activatable element 5 positioned on the side of the case 2, this element 5 may be for example a push-button, a crown or also a winding-button.

Figure 3:
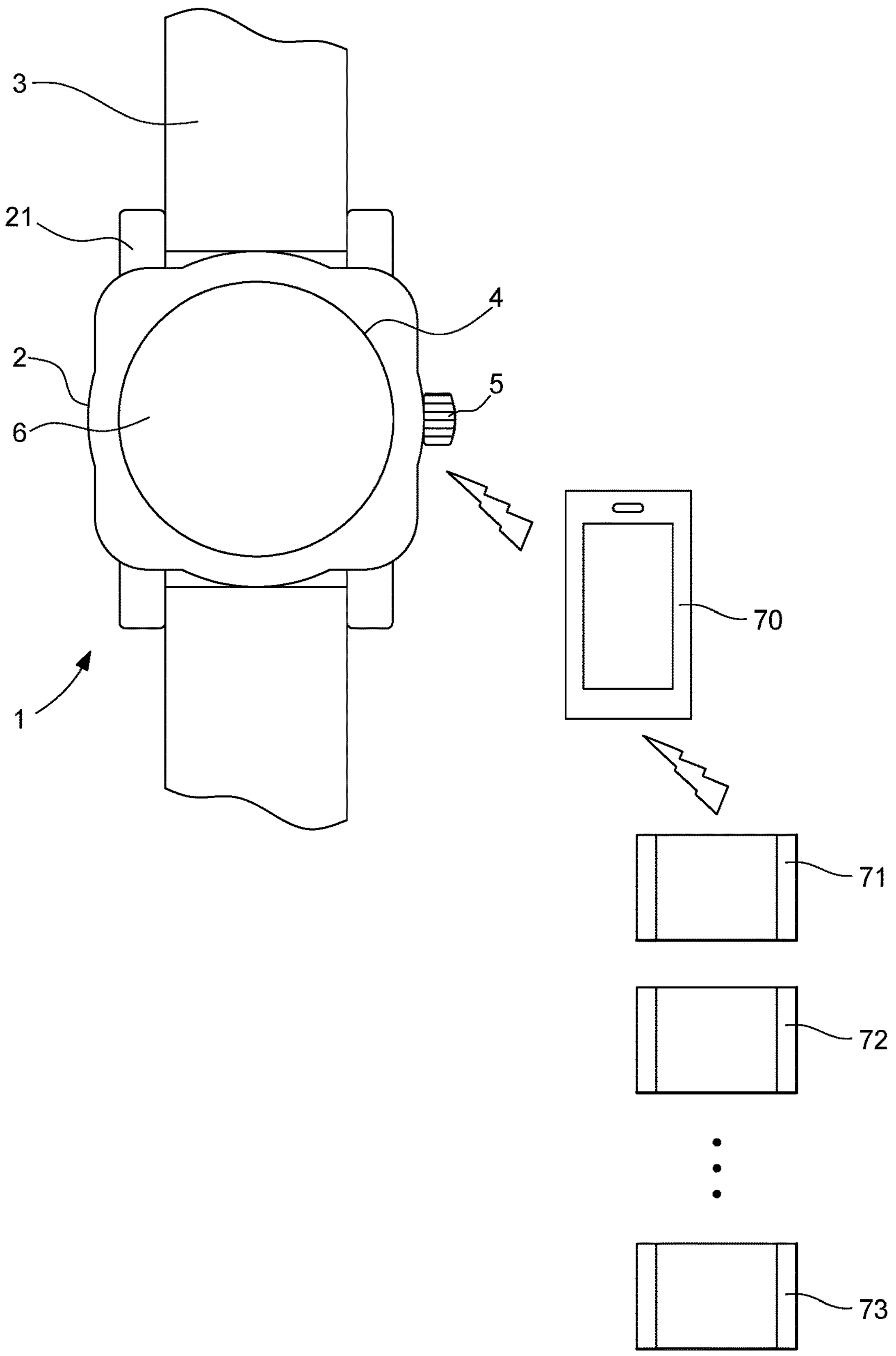
FIG. 3 is a representation of an example of communication of a watch with a plurality of external devices through a smartphone.

In FIG. 3, the case 2 of the watch 1 includes a receiving volume 4 defined by the middle and housing digital means. The receiving volume 4 of the watch 1 is closed by a digital display 6. The display 6 may be supported in a manner known per se by the middle and sealingly fastened to it by a suitable method.

Apart from the basic chronological indication functions, the display 6 may be used by digital means 8 to display a command interface comprising command suggestions to controlled or external devices. The digital means 8 may be integrated on the same electronic circuit or be broken down into various electronic components or circuits. The digital means 8 here include a processing unit 81 or controller, a wireless communication circuit 82, a geolocation device 83, an interface for measuring or receiving physiological data 84, and an accelerometer 85. The digital means 8 may also comprise a database 86 (for example stored in a non-volatile memory) and a microphone 87. For the sake of completeness, the digital means 8 here include a combination of a multitude of functions, the invention of course being able to be implemented with only some of them.

As we have already mentioned, the external device is an electronic device that may be controlled remotely through a wireless link by the present watch. It may in a non-limiting and non-exhaustive manner concern a television, an audio system and/or video, a home automation installation, a toy or also portable earphones, etc.

The processing unit 81 is particularly configured to transmit a command to at least one external device depending on an audible signal received on the microphone 87. Such a command is transmitted through the wireless communication circuit 82. The processing unit 81 may particularly be provided with a voice recognition function to identify phonemes pronounced by a user and identify a potential command in a list of possible commands for an external device. The command thus identified is transmitted through the wireless communication circuit 82.

Figure 2:
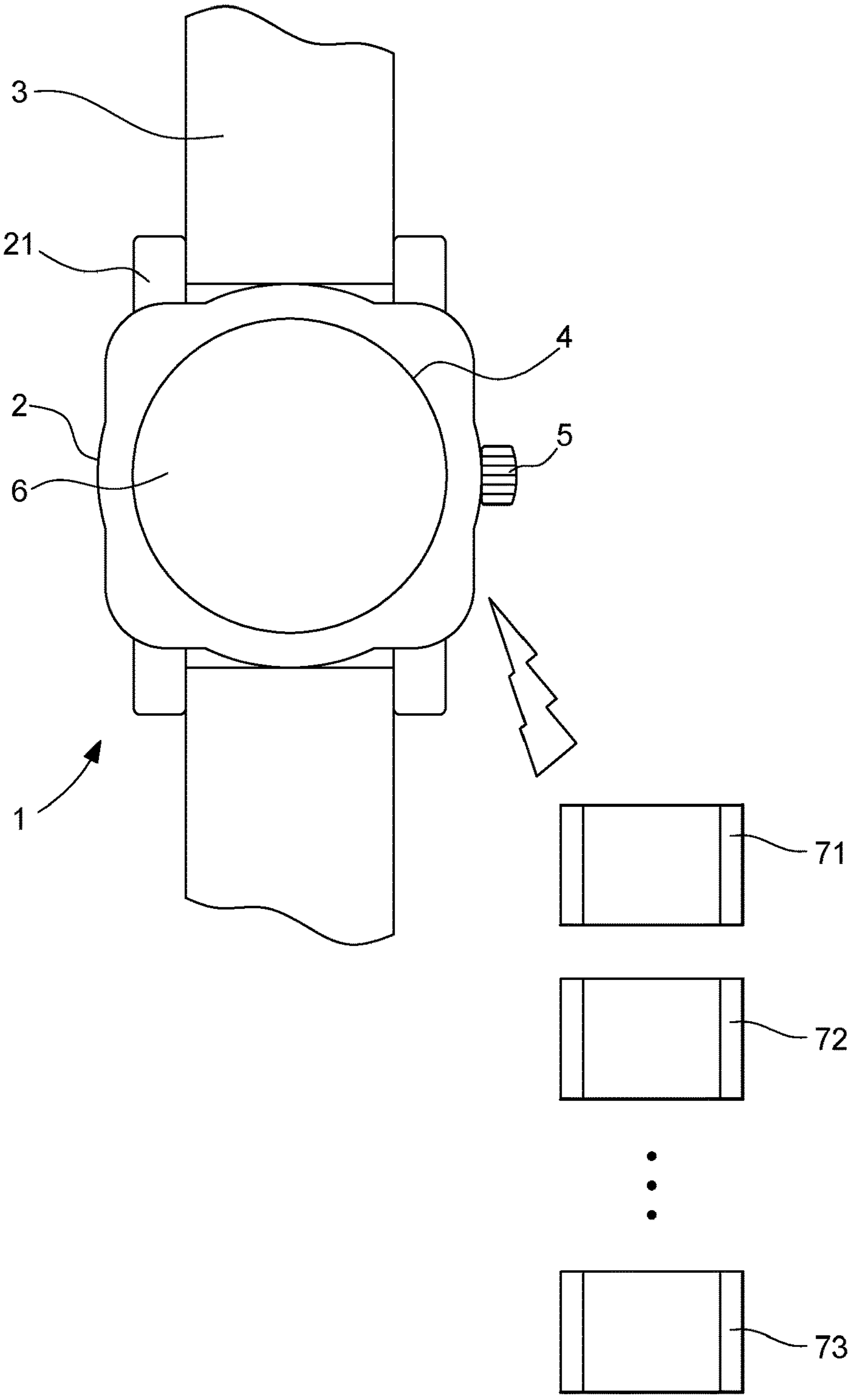
FIG. 2 is a representation of an example of direct communication of a watch with a plurality of external devices.

FIG. 2 schematically illustrates the possibility for the watch 1 to transmit commands for controlling various devices 71, 72 or 73, through its wireless communication circuit 82. The watch 1 here is autonomous and capable of sending such commands directly to the devices 71 to 73.

FIG. 3 schematically illustrates the possibility for the watch 1 to transmit commands for controlling various devices 71 to 73, by using a smartphone or a tablet 70 as relays, through its wireless communication circuit. The smartphone or the tablet 70 are configured to execute various applications, each of these applications being configured to control a respective device 71 to 73. The applications of the smartphone or of the tablet 70 are then used as relays for the commands transmitted by the watch to the devices 71 to 73.

In the presence of a noisy environment or requiring silence, the user also has a manual command selection interface to an external device.

Figure 4:
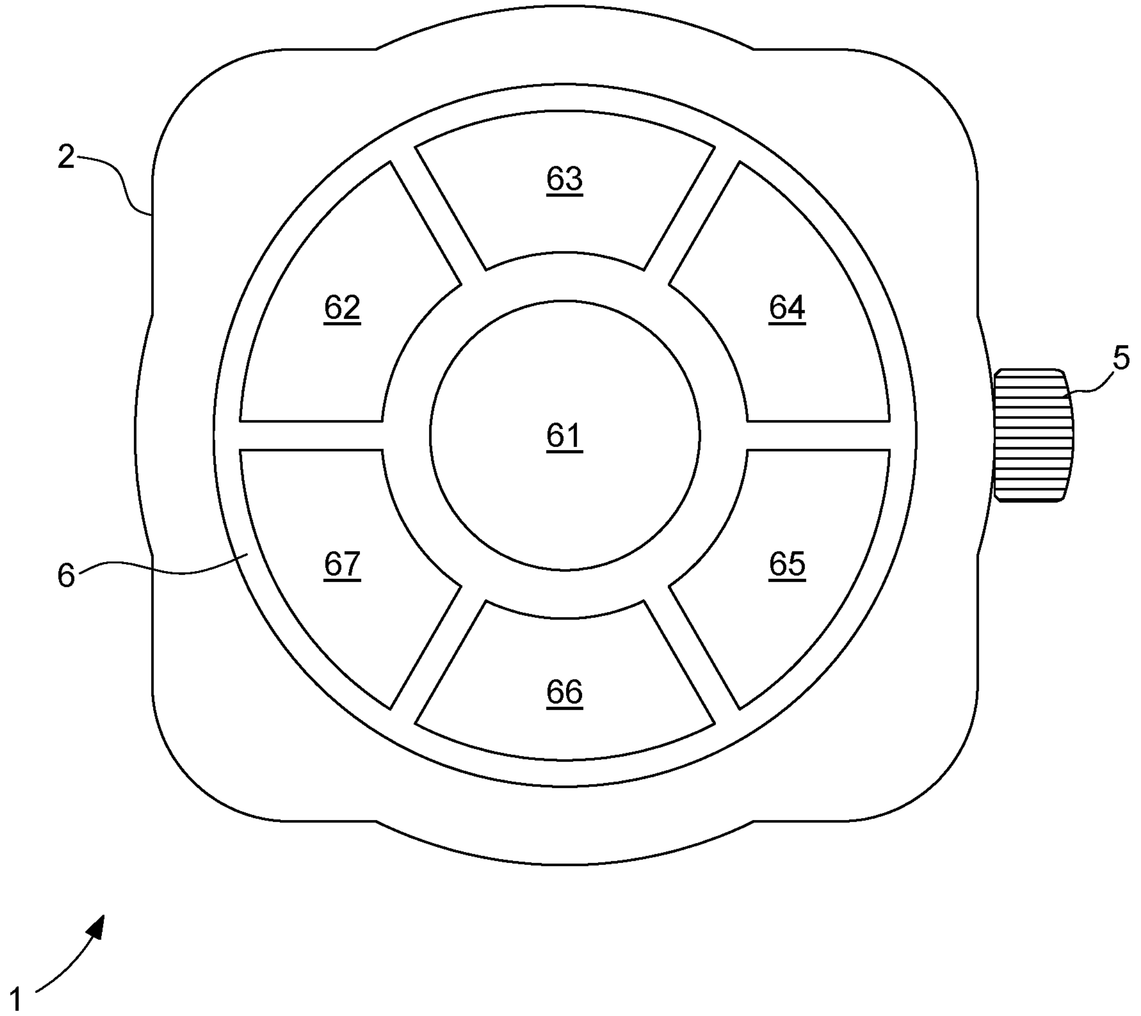
FIG. 4 is an enlarged top view of various display areas at the display of the watch of FIG. 1.

FIG. 4 is a top view of the watch 1 at its digital display 6. The digital display 6 here includes a plurality of display areas 61 to 67 that may be used by the processing unit 81 to display command suggestions. The processing unit 81 may be configured to display different display areas of this illustration in number and in distribution, depending particularly on the number of suggested commands. It will be noted that these display areas can be seen through various corresponding activatable/selectable portions of the manual selection interface.

This interface for manually selecting a command may for example consist of a touch surface of the display 6, making it possible to select a command by directly pressing on one of its activatable/selectable portions corresponding to one of the display areas 61 to 67. The manual selection interface may also include the activatable element 5 to sequentially preselect the various display areas (for example via short presses), then to select a corresponding command of the preselected display area (for example via a long press).

Figure 5:
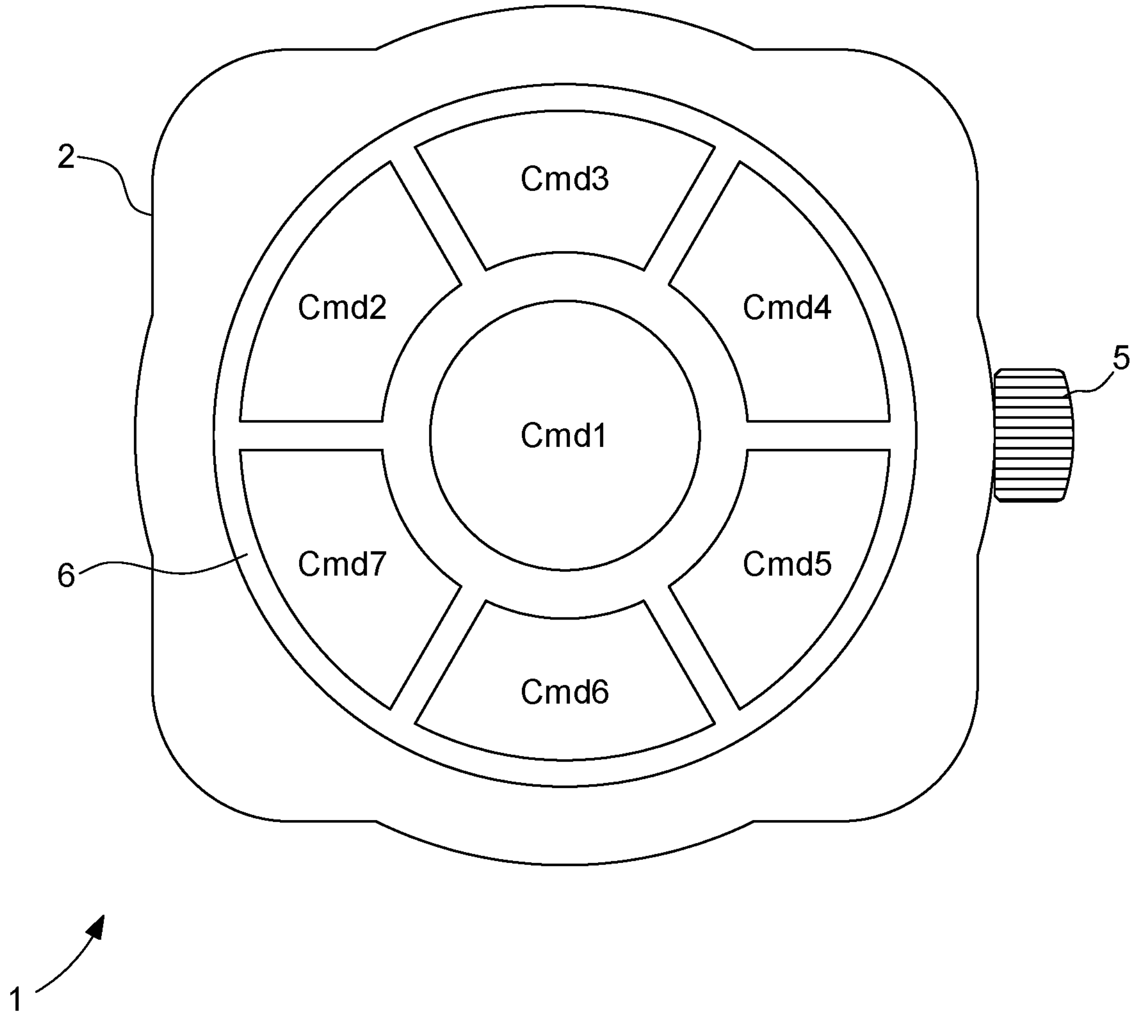
FIG. 5 is an enlarged top view of a first level of display of commands.

As illustrated in FIG. 5, the display 6 displays commands Cmd1, Cmd2, Cmd3, Cmd4, Cmd5, Cmd6 and Cmd7 in the various display areas. These commands may be a first level of suggested commands, for example the selection of an external device or a shortcut to the last command selected or the opposite of the last command selected. The display of the last commands selected may be carried out either by mentioning such a description ("last command", "penultimate command") or by explicitly repeating the content of these commands.

Figure 6:
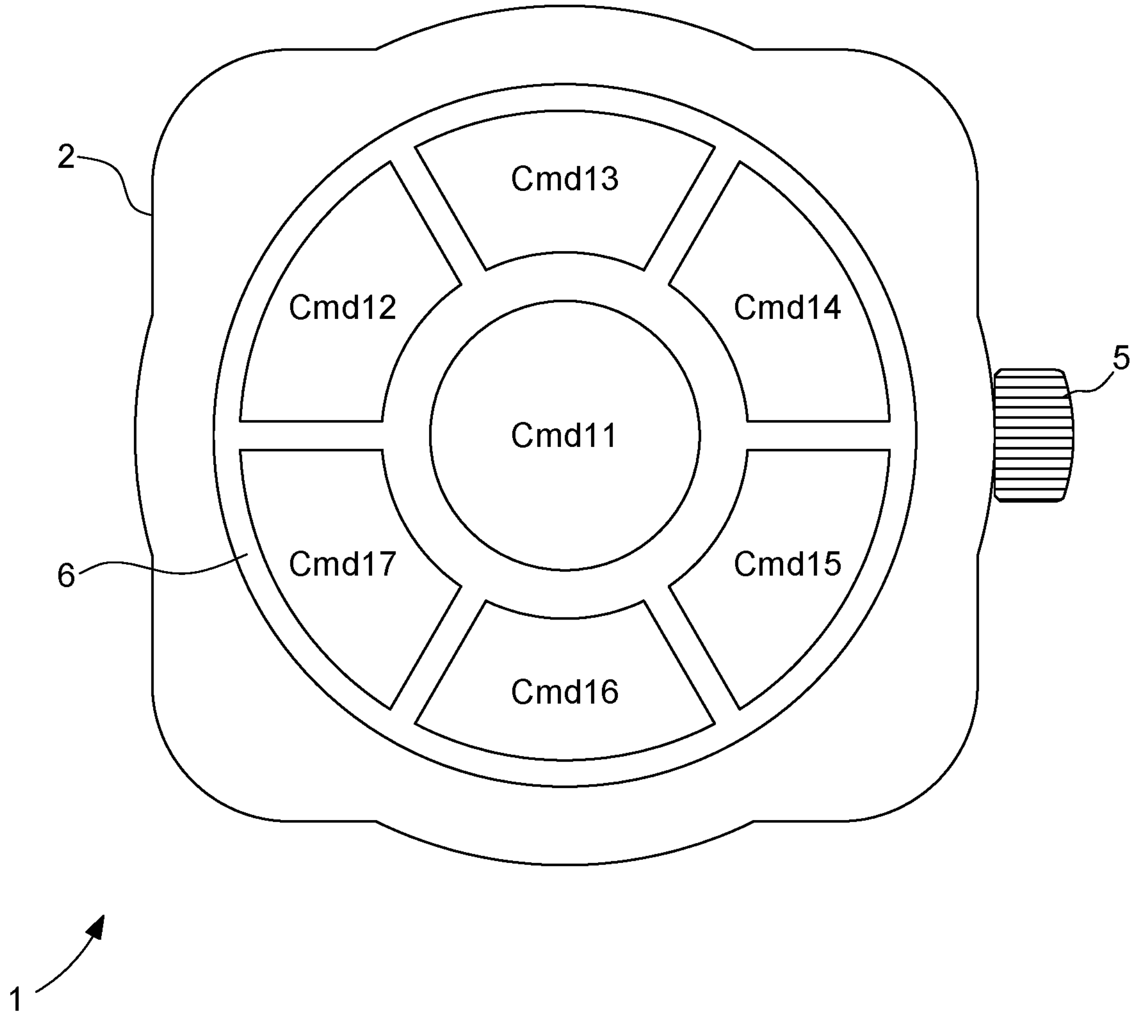
FIG. 6 is an enlarged top view of a second level of display of commands.
Figure 7:
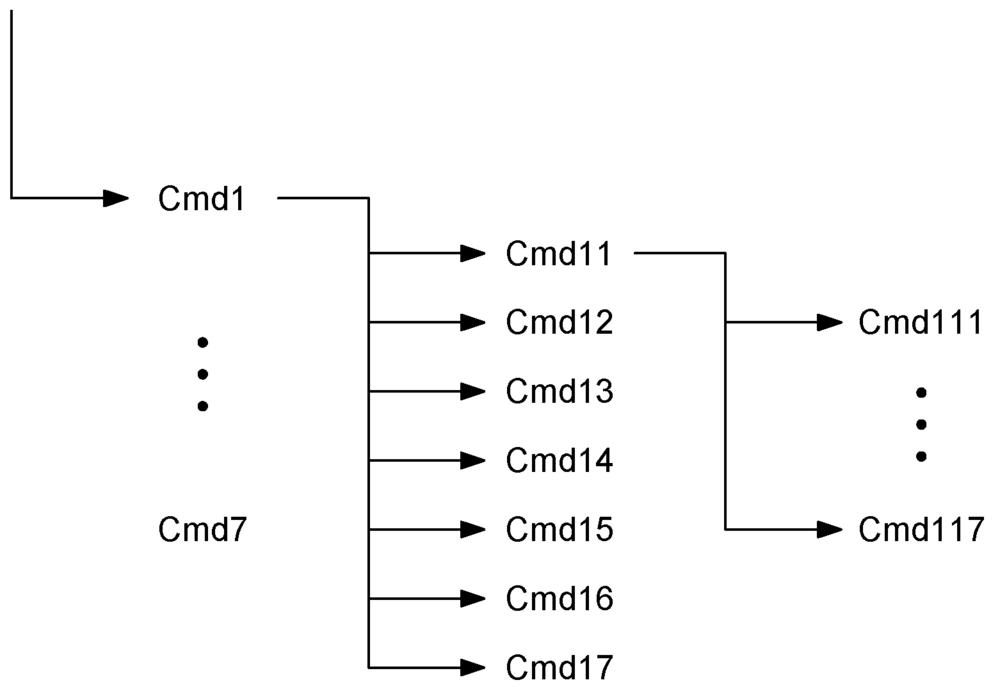
FIG. 7 is a schematic illustration of an example of tree structure of the display of commands.

With reference to FIG. 7, by selecting one of the commands, the display 6 may be brought to display other commands according to a tree structure. Thus, by selecting one of the commands Cmd1 (for example an external device identifier), the display 6 may display other commands Cmd11, Cmd12, Cmd13, Cmd14, Cmd15, Cmd16 and Cmd17, as illustrated in FIG. 6 (to suggest for example commands more specifically intended for the external device selected). It is understood that some or all of the commands Cmd11, Cmd12, Cmd13, Cmd14, Cmd15, Cmd16 and Cmd17 selected may also comprise other commands such as for example the command Cmd11 that includes the commands Cmd111 to Cmd117.

The succession of displays may correspond to a tree structure as illustrated by way of example in FIG. 7. The first level of the tree structure may suggest specific commands, for example selected in the following list: start, stop, switch on, switch off, lower. The second level of the tree structure may suggest commands associated with a parameter, for example selected in the following list: volume, brightness, speed. The third level of the tree structure may suggest various external devices available for the application of the command, for example selected in the following list: a television, a connected enclosure, earphones, etc. The fourth level of the tree structure may suggest various amplitudes of certain commands, for example 30%, half, 80%, corresponding to increase or lower commands for example.

With such a tree structure system, it is possible to provide for that the command is transmitted to an external device after selecting a combination of a plurality of successive commands through the manual selection interface.

The processing unit 81 is further configured to take into account one of the following criteria to define a list of command suggestions to be displayed (for example for all of the commands Cmd1, Cmd2, Cmd3, Cmd4, Cmd5, Cmd6 and Cmd7): a history of commands previously selected by the user, environmental criteria, physiological criteria of the wearer of the watch 1, behavioural criteria of the wearer of the watch 1 or state criteria of the external device. The processing unit 81 is further configured to display the command interface on the digital display 6 comprising the command suggestions defined in this list. The processing unit 81 is further configured to subsequently identify the selection of one of the commands displayed on the display 6, through its manual selection interface. The processing unit 81 is then configured to transmit a command to one of the external devices 71 to 73 or the smartphone 70 for example, depending on the command of which the selection has been identified. This transmission of commands is performed through the wireless communication circuit 82.

Thus, the watch 1 and in particular its processing unit 81 that is connected to the selection interface, has a possibility of recovering manual commands when the reception of an audible command by the microphone is unavailable or undesirable. Furthermore, the recovery of a manual command has an optimised ergonomics so as not to render the manipulation tedious, due to an intelligent management of at least one of the commands displayed on the display 6.

In this context, the processing unit 81 of the watch is capable of implementing a computer program such as a learning algorithm that is capable of dynamically generating on the digital display 6 the command interface comprising the command suggestions to the user. Alternatively or additionally, the processing unit 81 executing this algorithm is capable of proactively generating and transmitting at least one command to at least one external device thus preventing any interaction of the user with the selection interface. It will be noted that such a watch may control one or more external devices particularly at the same time.

Such a learning algorithm is known as "machine learning algorithm". More particularly, here it concerns a learning algorithm relating to the past selection of commands by the manual selection interface. This algorithm may be the subject of automatic training also called machine learning that is preferably supervised. Based on data recovered in the database 86, the processing unit 81 may be trained on the basis of at least one neural network and/or of an analytical function and/or of a polynomial regression principle. Within the scope of its execution, the algorithm is capable of generating command suggestions to be displayed and also capable of learning if certain commands have a greater possibility of being selected in a given context, by combining for example the commands selected in the past with other data such as environmental criteria, physiological criteria of the wearer of the watch 1, behavioural criteria of the wearer of the watch 1 or state criteria of an external device.

In the present embodiment, this processing unit 81 by executing this algorithm is capable of generating the history of commands previously selected by the user. For this, the processing unit 81 is capable of detecting from the selection interface, at least one activatable portion corresponding to at least one display area 61 to 67 that is attributed to the last command selected by the user, and that may have the highest probability of selection or inversely make it possible to determine whether a command contrary to this last command may have this higher probability of selection. For this, the learning algorithm may take into account previously selected commands as well as context elements. To this end, the database 86 will be able to store a history of a certain number of last commands selected. The content of the database 86 will be able for example to be used as learning content for such a learning algorithm.

In this context, physiological criteria of the wearer of the watch 1 may be used by this algorithm implemented by the processing unit 81. Indeed, the processing unit 81 may be configured to use data provided by the interface for measuring physiological data 84. Among other parameters that can be provided to take into account these physiological data, it is possible for example to envisage pulse, blood oxygen saturation, skin impedance, blood pressure, respiration rate, respiratory arrhythmia, skin temperature, sweat rate, or blood flow rate, etc. It is possible for example to take into account a slowing of the heart rate below a certain threshold to suggest a command to switch off a television, in order to anticipate drowsiness of the user. An interface for measuring or receiving physiological data is known per se by the person skilled in the art.

The algorithm executed by the processing unit 81 may also take into account environmental criteria. More specifically, the processing unit 81 may be configured to use data provided by the digital means 8. By way of example, these environmental criteria may comprise a noise level provided by a microphone 87 connected to the processing unit 81, an ambient light level provided by a photosensitive sensor (not shown), a position of the watch 1 calculated by the accelerometer 85, or atmospheric conditions determined by a pressure sensor (not shown) or by the geolocation device 83.

In this embodiment, the processing unit 81 executing this algorithm may also take into account state criteria of the external device, such as for example the power supply state of a device—on, standby, stopped—, the distance between the watch 1 and this external device, operating parameters (if it concerns a television: sound level of the television in relation to the ambient noise, brightness level of the television in relation to the ambient brightness, operating time, etc.). A switch-on command may for example be suggested for a home automation application, if the surrounding lights are identified as switched off and the watch is determined as having a short distance from these lights.

The processing unit 81 executing this algorithm may also take into account behavioural criteria, such as measurements of the activity level of the user by means of the accelerometer 85 or of the geolocation device 83 or also the identification of a movement or of a series of movements carried out by the user/wearer of this watch from the accelerometer 85 for example in order to detect a sports practice or a movement. By detecting a sports practice, the list of suggested commands may be established by estimating for a wearing of earphones by the user the moment where they wish to select a command.

Advantageously, it can be envisaged that the processing unit 81 is configured to proactively send one of the suggested commands to an external device. For example, during the detection of the slowing of the heart rate, after having suggested a command to switch off a television, the processing unit 81 will be able to send this switch-off command autonomously after a duration of display on the digital display 6.

Figure 8:
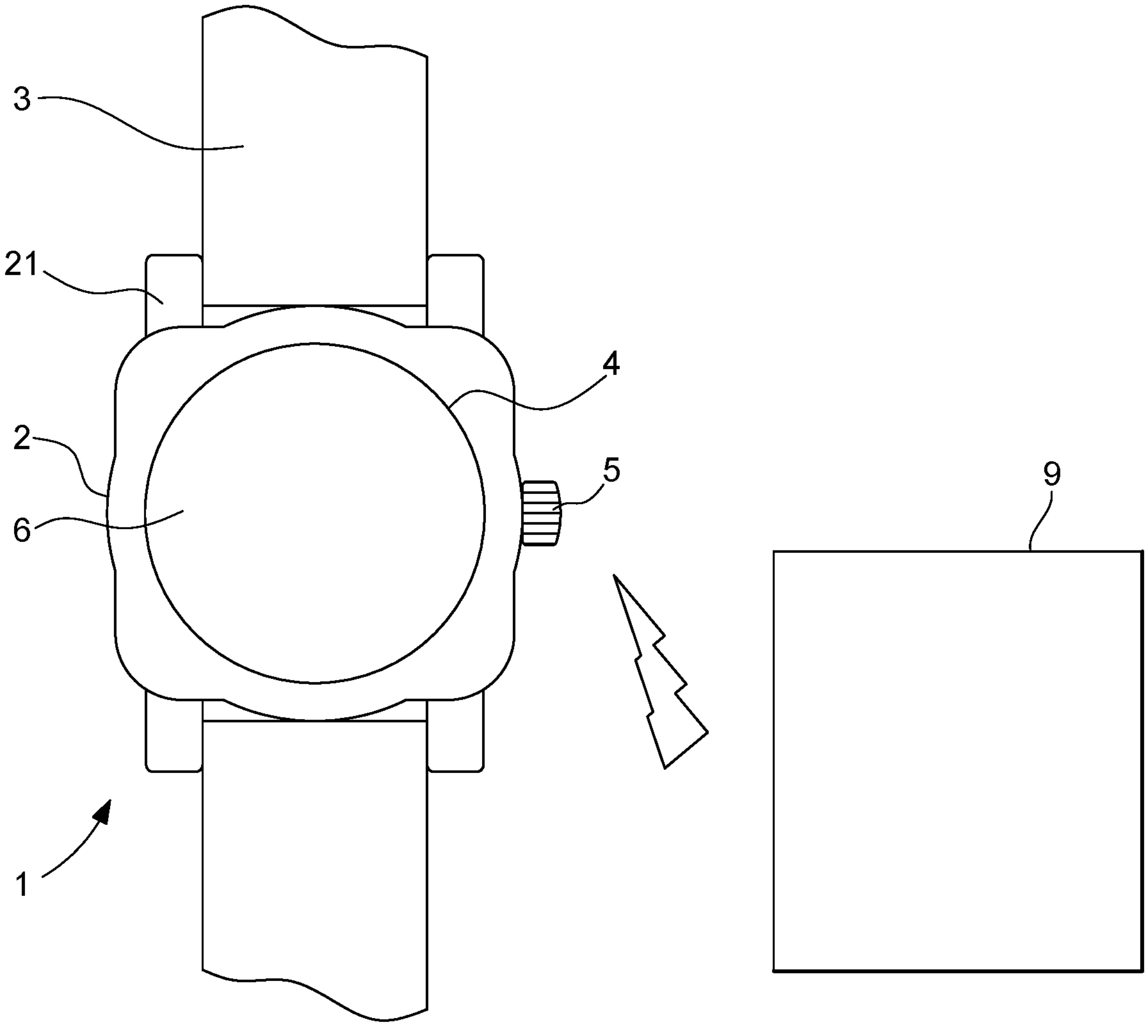
FIG. 8 illustrates the watch of FIG. 1 in communication with a server.

The learning algorithm may be implemented remotely, for example on the smartphone 70 or on a server 9 in communication with the watch 1 (as illustrated in FIG. 8), in order to potentially have superior resources. As the training data may be based on data available locally, the learning may be optimal and dedicated to the watch 1 user.

The display 6 may be a general display, used sequentially by various functions of the watch 1. It is also possible to envisage that the display 6 is a general display used simultaneously by various functions of the watch.

The processing unit 81 may be implemented in the form of a controller microphone or of a digital processor. The function of the processing unit 81 may be partially remote from the watch 1. For example, voice recognition functions or learning algorithms defining the predictive model for selecting commands may be implemented on a remote server, or on the smartphone 70 that may have more resources. For the voice recognition, the audible signal received by the watch 1 may be transmitted to a remote device through the wireless communication circuit 82, then this remote device may send back to the watch 1 the transcription of the audible signal in a sequence of characters or of words identified by a voice recognition function.

The wireless communication circuit 82 is configured to communicate wirelessly with an external device such as mentioned above.

The communication circuit 82 may communicate according to any appropriate radio protocol, in a manner known per se.

The geolocation device 83 is a circuit known per se that makes it possible to generate location information of the watch 1. The geolocation device 83 may for example determine the instantaneous location of the watch 1 by communicating with a satellite network such as the Global Positioning Service or Galileo.

NOMENCLATURE

1. watch
2. case
3. bracelet
4. receiving volume
5. activatable element
6. digital display
7. exposure display
8. digital means
9. server
21. horns
61. display area
62. display area
63. display area
64. display area
65. display area
66. display area
67 display area
70 smartphone
71 external device
72 external device
73 external device
81. processing unit
82 wireless communication circuit
83 geolocation device
84 physiological data interface
85 accelerometer
86 database
87 microphone
91 communication interface
92 database

The invention claimed is:

1. A timepiece for transmitting commands to an external device, comprising:
a digital display;
a wireless communication circuit;
a manual selection interface;
a microphone; and
a processing unit configured to:
transmit a command to an external device depending on an audible signal received on the microphone, through the wireless communication circuit;
depending on a history of previously selected commands, environment criteria, behavioural criteria, physiological criteria of the wearer of the timepiece, or state criteria of the external device, define a list of command suggestions to be displayed;
display on the digital display a command interface comprising said command suggestions of the defined list;
identify the selection of a plurality of commands displayed on the digital display, through the manual selection interface; and
transmit a command to the external device based on a combination of the selected plurality of commands, through the wireless communication circuit.

2. The timepiece according to claim 1, further comprising an interface for measuring physiological data of a wearer of the timepiece, said processing unit being configured to define the list of command suggestions to be displayed depending on physiological criteria of the wearer of the timepiece.

3. The timepiece according to claim 1, further comprising a geolocation device, said processing unit being configured to define the list of command suggestions to be displayed depending on the position of the timepiece determined by the geolocation device.

4. The timepiece according to claim 1, further comprising a memory storing one or more of the last commands transmitted, said processing unit being configured to define the list of command suggestions to be displayed by including one or more of the last commands stored or one or more commands contrary to these last commands.

5. The timepiece according to claim 1, further comprising an accelerometer, said processing unit being configured to define the list of command suggestions to be displayed depending on the accelerations measured by the accelerometer.

6. The timepiece according to claim 1, wherein said processing unit is configured to define the list of command suggestions to be displayed depending on a state criterion detected for the external device and a distance of the external device to the timepiece.

7. The timepiece according to claim 1, wherein the manual selection interface is a touch screen associated with the digital display.

8. The timepiece according to claim 1, wherein the processing unit implements a learning algorithm that is capable of contributing to dynamically generating on the digital display said command interface comprising the command suggestions.

9. The timepiece according to claim 1, wherein the define the list of command suggestions to be displayed comprises defining a tree structure of command suggestions that comprises a plurality of levels of suggested commands.

10. The timepiece according to claim 9, wherein the display on the digital display the command interface comprising said command suggestions of the defined list comprises displaying suggested commands associated with one level of the plurality of levels of suggested commands.

11. The timepiece according to claim 9, wherein the suggested commands in each subsequent level of the plurality of levels are associated with the suggested commands in a corresponding preceding level of the plurality of levels.

12. The timepiece according to claim 10, wherein in response to a selection of a command associated with the one level, said processing unit is further configured to update the digital display to display the suggested commands associated with another level of the plurality of levels of suggested commands.

13. The timepiece according to claim 12, wherein the one level is a first level of suggested commands and the another level is a second level of suggested commands associated with the selected command from the first level.

14. The timepiece according to claim 10, wherein the identify the selection of the plurality of commands displayed on the digital display and the transmit the command to the external device based on the combination of the selected plurality of commands comprises: identifying each selected command associated with each level of the plurality of levels of suggested commands, combining the selected commands to generate a resulting command, and transmitting the resulting command to the external device.

* * * * *